(12) United States Patent
Dice et al.

(10) Patent No.: US 7,496,716 B2
(45) Date of Patent: Feb. 24, 2009

(54) METHODS AND APPARATUS TO IMPLEMENT PARALLEL TRANSACTIONS

(75) Inventors: David Dice, Foxborough, MA (US); Nir N. Shavit, Cambridge, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 281 days.

(21) Appl. No.: 11/488,618

(22) Filed: Jul. 18, 2006

(65) Prior Publication Data

US 2007/0198781 A1 Aug. 23, 2007

Related U.S. Application Data

(60) Provisional application No. 60/775,580, filed on Feb. 22, 2006, provisional application No. 60/775,564, filed on Feb. 22, 2006, provisional application No. 60/789,483, filed on Apr. 5, 2006.

(51) Int. Cl.
*G06F 12/00* (2006.01)
(52) U.S. Cl. ...................................... 711/147
(58) Field of Classification Search ....................... None
See application file for complete search history.

(56) References Cited

U.S. PATENT DOCUMENTS

2005/0038961 A1 * 2/2005 Chen ........................ 711/118

2007/0124546 A1 * 5/2007 Blanchard et al. ........... 711/152

OTHER PUBLICATIONS

Chris Purcell et al., Brief Announcement; Implementing Multi-Word Atomic Snapshots on Current Hardware, Jul. 25-28, 2004, p. 1, PODC '04.

* cited by examiner

*Primary Examiner*—Hiep T Nguyen
(74) *Attorney, Agent, or Firm*—Brooks Kushman P.C.

(57) ABSTRACT

Cache logic associated with a respective one of multiple processing threads executing in parallel updates corresponding data fields of a cache to uniquely mark its contents. The marked contents represent a respective read set for a transaction. For example, at an outset of executing a transaction, a respective processing thread chooses a data value to mark contents of the cache used for producing a transaction outcome for the processing thread. Upon each read of shared data from main memory, the cache stores a copy of the data and marks it as being used during execution of the processing thread. If uniquely marked contents of a respective cache line happen to be displaced (e.g., overwritten) during execution of a processing thread, then the transaction is aborted (rather than being committed to main memory) because there is a possibility that another transaction overwrote a shared data value used during the respective transaction.

20 Claims, 7 Drawing Sheets

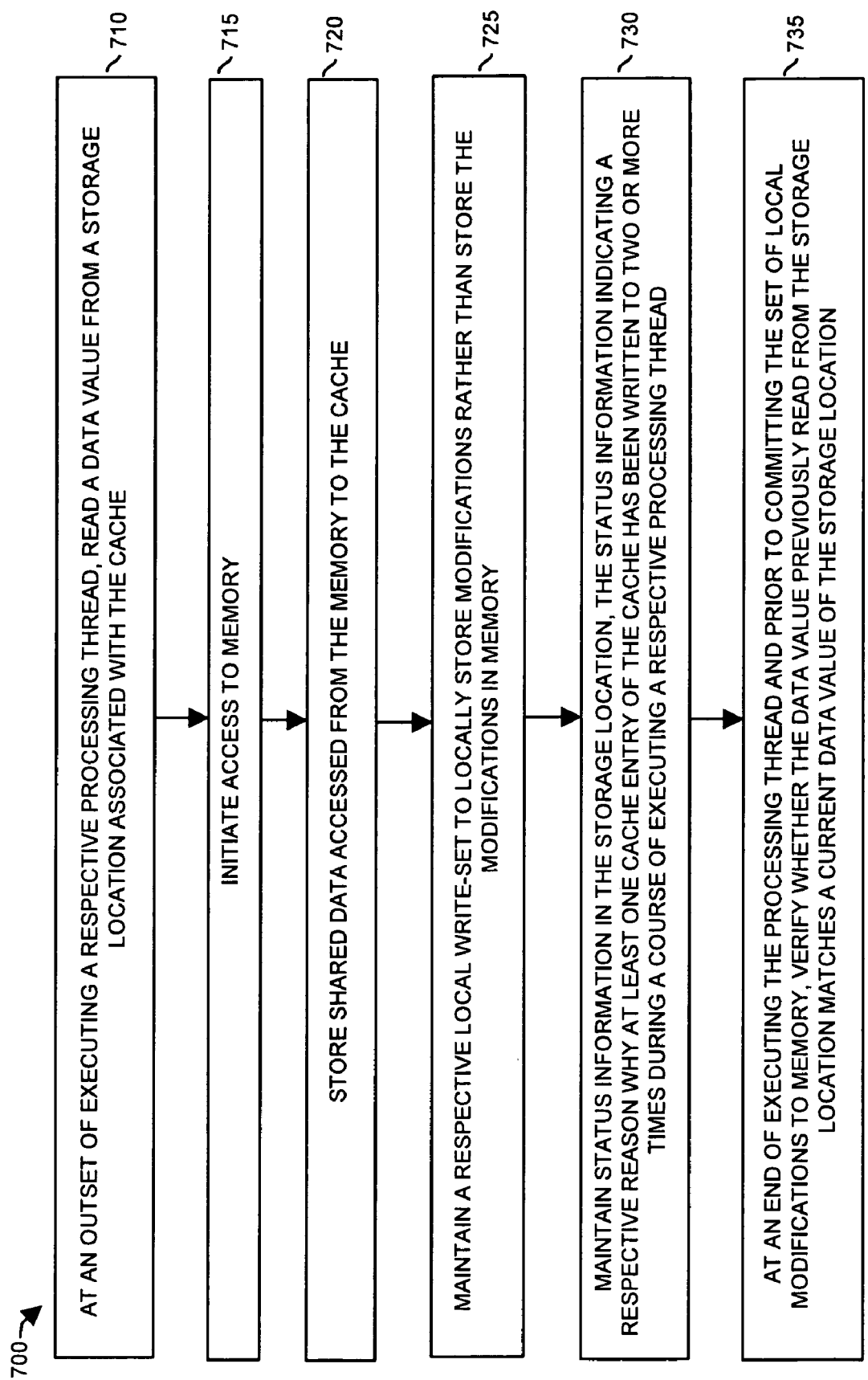

US 7,496,716 B2

METHODS AND APPARATUS TO IMPLEMENT PARALLEL TRANSACTIONS

RELATED APPLICATION

This application is related to U.S. patent application Ser. No. 11/475,716, filed on Jun. 27, 2006, entitled "METHODS AND APPARATUS TO IMPLEMENT PARALLEL TRANSACTIONS," which itself claims the benefit of and priority to U.S. Provisional Patent Application Ser. No. 60/775,580, filed on Feb. 22, 2006, entitled "Transactional Locking," the entire teachings of which are incorporated herein by this reference.

This application is also related to and claims the benefit of earlier filed U.S. Provisional Patent Application Ser. No. 60/775,580 filed on Feb. 22, 2006, U.S. Provisional Patent Application Ser. No. 60/775,564 filed on Feb. 22, 2006, and U.S. Provisional Patent Application Ser. No. 60/789,483 filed on Apr. 5, 2006, the entire teachings of which are incorporated herein by this reference.

BACKGROUND

There has been an ongoing trend in the information technology industry to execute software programs more quickly. For example, there are various conventional advancements that provide for increased execution speed of software programs. One technique for increasing execution speed of a program is called parallelism. Parallelism is the practice of executing or performing multiple things simultaneously. Parallelism can be possible on multiple levels, from executing multiple instructions at the same time, to executing multiple threads at the same time, to executing multiple programs at the same time, and so on. Instruction Level Parallelism or ILP is parallelism at the lowest level and involves executing multiple instructions simultaneously. Processors that exploit ILP are typically called multiple-issue processors, meaning they can issue multiple instructions in a single clock cycle to the various functional units on the processor chip.

There are different types of conventional multiple-issue processors. One type of multiple-issue processor is a superscalar processor in which a sequential list of program instructions are dynamically scheduled. A respective processor determines which instructions can be executed on the same clock cycle, and sends them out to their respective functional units to be executed. This type of multi-issue processor is called an in-order-issue processor since issuance of instructions is performed in the same sequential order as the program sequence, but issued instructions may complete at different times (e.g., short instructions requiring fewer cycles may complete before longer ones requiring more cycles).

Another type of multi-issue processor is called a VLIW (Very Large Instruction Width) processor. A VLIW processor depends on a compiler to do all the work of instruction reordering and the processor executes the instructions that the compiler provides as fast as possible according to the compiler-determined order. Other types of multi-issue processors issue out of order instructions, meaning the instruction issue order is not be the same order as the order of instructions as they appear in the program.

Conventional techniques for executing instructions using ILP can utilize look-ahead techniques to find a larger amount of instructions that can execute in parallel within an instruction window. Looking-ahead often involves determining which instructions might depend upon others during execution for such things as shared variables, shared memory, interference conditions, and the like. When scheduling, a handler associated with the processor detects a group of instructions that do not interfere or depend on each other. The processor can then issue execution of these instructions in parallel thus conserving processor cycles and resulting in faster execution of the program.

One type of conventional parallel processing involves a use of coarse-grained locking. As its name suggests, coarse-grained locking prevents conflicting groups of code from operating on different processes at the same time based on use of lockouts. Accordingly, this technique enables non-conflicting transactions or sets of instructions to execute in parallel.

Another type of conventional parallel processing involves a use of fine-grain locking. As its name suggests, fine-grain locking prevents conflicting instructions from being simultaneously executed in parallel based on use of lockouts. This technique enables non-conflicting instructions to execute in parallel.

As discussed below, the present disclosure is directed towards different types of TLP (thread level parallelism) techniques.

SUMMARY

Techniques discussed herein deviate with respect to conventional applications such as those discussed above as well as other techniques known in the prior art. For example, embodiments herein include techniques for enhancing performance associated with transactions executing in parallel.

In general, one embodiment herein is directed to a hybrid transactional memory technique including a hardware transactional memory implementation and a software transactional memory implementation to carry out execution of multiple processing threads based on use of a common set of shared data. For example, a respective processing thread relies on use of a (remote) hardware transactional memory implementation to maintain a respective read-set associated with a transaction. The respective processing thread maintains the write-set to keep track of modified data values.

More specifically, a hardware transactional memory implementation according to embodiments herein enables each of multiple processing threads to keep track of a respective status associated with a set of specific shared data utilized by a respective processing thread to produce a respective transaction outcome. For example, in one embodiment, each of the processing threads has an associated or dedicated cache (or portion of a cache).

At or around the beginning of a transaction, the respective processing thread provides a unique value for marking contents (e.g., data values retrieved from main memory and stored in the cache) of the cache that are used to produce a transaction outcome associated with the respective transaction. Upon each read from main memory, cache logic (e.g., hardware) associated with the processing thread stores corresponding data associated with the read in a cache. Upon storage in the cache, the cache logic marks the corresponding data retrieved from main memory with the unique value to identify the corresponding data as being used by the respective transaction to produce a transaction outcome. For example, one embodiment herein involves annotating (e.g., marking) the respective cache line on all accesses. An access can "hit" in the cache (i.e., the cache line in question is already in the cache) or the access can "miss". In this latter case, we displace (evict) a line from the cache, making room for the about-to-be-loaded line, and then load the line in question from memory into the cache. In both cases we'll mark the cache line metadata (dc_txsequence metadata field) with the current value found in the processor's TXSEQUENCE register.

If the cache logic happens to displace (e.g., evict) or invalidate a cache line that has already been marked with the unique stamp value during execution of the given processing thread, then the cache logic modifies the status information (e.g., the cache logic increments a so-called Interference register) to indicate that either i) another processing thread changed a previously read value in main memory and the cache was updated with the new value, or ii) the processing thread caused portions of the cache to be overwritten with new data because it used generated so many reads of data from main memory to overflow use of the cache.

There are two common mechanisms to handle write-sets. In TL and TL2, we favor what's called a 'speculative write buffer' implementation of the write-set, where the stores are kept in a thread-private buffer until commit-time. An alternate scheme is, at transactional store-time, to acquire the lock covering the variable and then to save the current value of the shared variable into a thread-private undo-log and then perform the requested store directly into the shared location. If the transaction aborts then the undo-log comes into play and the transactional infrastructure will restore the shared variables by using the undo-log. If the transaction succeeds, then the undo-log is simply discarded.

While we favor a speculative write buffer (as discussed herein) or read-set assist, the hardware assist techniques herein can be used in connection with undo-logs as well.

The software transactional memory implementation associated with the hybrid discussed above enables the processing threads to, via software executed by the respective processing thread, maintain a respective set of local modifications to the set of specific shared data. For example, as discussed above, a respective processing thread initiates loading (e.g., reads) of shared data from main memory. Via the software transactional memory implementation according to embodiments herein, the processing thread produces results that are stored in a local repository rather than in main memory. The local repository is accessible only by the processing thread while main memory is accessible by all processing threads.

At the end of executing a respective transaction, the processing thread attempts to commit corresponding results temporarily stored in the local repository to main memory. However, prior to actually writing the results, the processing thread must make be sure that none of the other processes modified any of the values read from main memory stored in the cache. This prevents corruption of data.

In one embodiment, the processing thread checks the status information (e.g., the INTERFERENCE register) to identify whether another processing thread possibly modified a portion of main memory that was used to produce a respective transaction outcome stored in the local repository. If so, the processing thread aborts a step of committing values in the local repository to main memory.

Accordingly, a combination of a hardware transactional memory implementation and a software transactional memory implementation as discussed herein enables multiple processing threads executing in parallel to produce respective results without corrupting data. That is, each process can utilize its own cache resources to keep track of data retrieved from main memory and identify if another process modifies such values during a window of use. If any critical variables have been modified during execution, a respective process can prevent corresponding computational results from being committed to memory.

More specifically, for each of multiple processes executing in parallel, as long as displaced portions of a respective cache (e.g., cache lines) have not already been uniquely marked, results of the respective transaction can be committed globally (to main memory) without causing data corruption by one or more processes simultaneously using the shared data. If a cache line happens to be evicted (as a result of another process modifying main memory) during execution of a respective transaction (and the value in the processor's TXSEQUENCE register matches the dc_txsequence metadata field in the cache line) then the transaction must be aborted. In other words, in such an instance, the transaction aborts itself to prevent storage of values in the local repository to main memory. For this latter case, the transaction can be re-executed until the process is able to commit respective results without causing data corruption.

In this way, each of multiple processes executing in parallel can "blindly" initiate computations using the shared data even though there is a chance that another process executing in parallel can initiate modification of a mutually used shared variable and prevent a process from globally committing its results to shared data a so-called commit phase.

According to further embodiments, a computer environment can be configured to maintain, for each of multiple processing threads, a corresponding cache to store a so-called read-set as discussed above. The read-set includes data values read from main memory that have been used by a respective transaction to produce a respective transaction outcome as previously discussed. For example, a modified processor according to embodiments herein stores the current TXSEQUENCE value into the cache line's dc-txsequence field on each read (load). If some other processor modifies main memory resulting in updating of a respective cache line associated with a transaction, the cache line will be invalidated and displaced (or evicted) from the cache as discussed above.

When a line is displaced from the cache, the processor will check the line's dc_txsequence field against the TXSEQUENCE register. If equal, the processor increments the INTERFERENCE register. This is a so-called case of remote eviction. In a similar vein, if a line associated with the read set is displaced through a capacity or conflict miss due to processor-local operations, the CPU will again check the dc-txsequence field against TXSEQUENCE and conditionally increment the data value in the INTERFERENCE register. This is a so-called case of self-eviction. In either case of local or remote eviction of a cache line, the transaction must be aborted due to the possibility of interference by another process.

Techniques herein are well suited for use in applications such as those supporting parallel processing and use of shared data. However, it should be noted that configurations herein are not limited to such use and thus configurations herein and deviations thereof are well suited for use in other environments as well.

In addition to the embodiments discussed above, other embodiments herein include a computerized device (e.g., a host computer, workstation, computer environment, etc.) configured to support the techniques (e.g., hardware transactional memory and/or software transactional memory) disclosed herein such as supporting parallel execution of transaction performed by different processes. In such embodiments, a computer environment includes a shared memory system, local memory system, a processor (e.g., a processing device), a respective display, and an interconnect connecting the processor and the memory system. The interconnect can also support communications with the respective display (e.g., display screen or display medium). The memory system can be encoded or programmed with an application that, when executed on the processor, supports parallel processing according to techniques herein.

Yet other embodiments of the present disclosure include software programs to perform the method embodiment and operations summarized above and disclosed in detail below in the Detailed Description section of this disclosure. More specifically, one embodiment herein includes a computer program product (e.g., a computer-readable medium). The computer program product includes computer program logic (e.g., software instructions) encoded thereon. Such computer instructions can be executed on a computerized device to support parallel processing according to embodiments herein. For example, the computer program logic, when executed on at least one processor associated with a computing system, causes the processor to perform the operations (e.g., the methods) indicated herein as embodiments of the present disclosure. Such arrangements as further disclosed herein can be provided as software, code and/or other data structures arranged or encoded on a computer readable medium such as an optical medium (e.g., CD-ROM), floppy or hard disk, or other medium such as firmware or microcode in one or more ROM or RAM or PROM chips or as an Application Specific Integrated Circuit (ASIC). The software or firmware or other such configurations can be installed on a computerized device to cause one or more processors in the computerized device to perform the techniques explained herein.

Yet another more particular technique of the present disclosure is directed to a computer program product that includes a computer readable medium having instructions stored thereon for to facilitate use of shared information among multiple processes. The instructions, when carried out by a processor of a respective computer device, cause the processor to enable each of multiple processing threads that execute in parallel and that have access to a common set of shared data to produce corresponding transaction outcomes based on: i) utilizing (or relying on) a hardware transactional memory implementation to track a status associated with a set of specific shared data utilized by a respective processing thread to produce a respective transaction outcome; and ii) utilizing a software transactional memory implementation associated with the respective processing thread to maintain a respective set of local modifications to the set of specific shared data. Other embodiments of the present application include software programs to perform any of the method embodiment steps and operations summarized above and disclosed in detail below.

It is to be understood that the system of the invention can be embodied as a software program, as software and hardware, and/or as hardware alone. Example embodiments of the invention may be implemented within computer systems, processors, and computer program products and/or software applications manufactured by Sun Microsystems Inc. of Palo Alto, Calif., USA.

BRIEF DESCRIPTION OF THE DRAWINGS

The foregoing and other objects, features, and advantages of the present application will be apparent from the following more particular description of preferred embodiments of the present disclosure, as illustrated in the accompanying drawings in which like reference characters refer to the same parts throughout the different views. The drawings are not necessarily to scale, with emphasis instead being placed upon illustrating the embodiments, principles and concepts.

FIG. 7 is a diagram of a flowchart according to an embodiment herein.

DETAILED DESCRIPTION

In general, cache logic associated with a respective one of multiple processing threads executing in parallel updates corresponding TXSEQUENCE data fields associated with data in the cache line to uniquely mark contents of a respective cache line that make up a respective read set for an executed transaction. For example, in one embodiment, at an outset of executing a transaction or respective processing thread, the respective processing thread chooses or writes a data value to mark contents of the cache used for producing a transaction outcome for the processing thread. Upon each read of shared data from main memory, the cache stores a copy of the data and marks it with the data value to identify the copy as being used during execution of the processing thread.

If a cache line being displaced already has been marked with the unique value during execution of the respective processing thread, then the cache logic modifies (e.g., increments) a so-called interference register accessible by the respective processing thread. At some time around the start of the transaction, the processing thread stores a data value associated with the interference register. Cache logic associated with a respective cache modifies the interference register to identify whether another processing thread interfered with data values currently used by a respective processing thread associated with the cache. If by the end of the transaction, the value in the interference register changes, the processing thread aborts itself (rather than commits its results to main memory) because there is a possibility that another transaction may have changed a shared data value used to produce a respective transaction outcome associated with a transaction.

Figure 1:
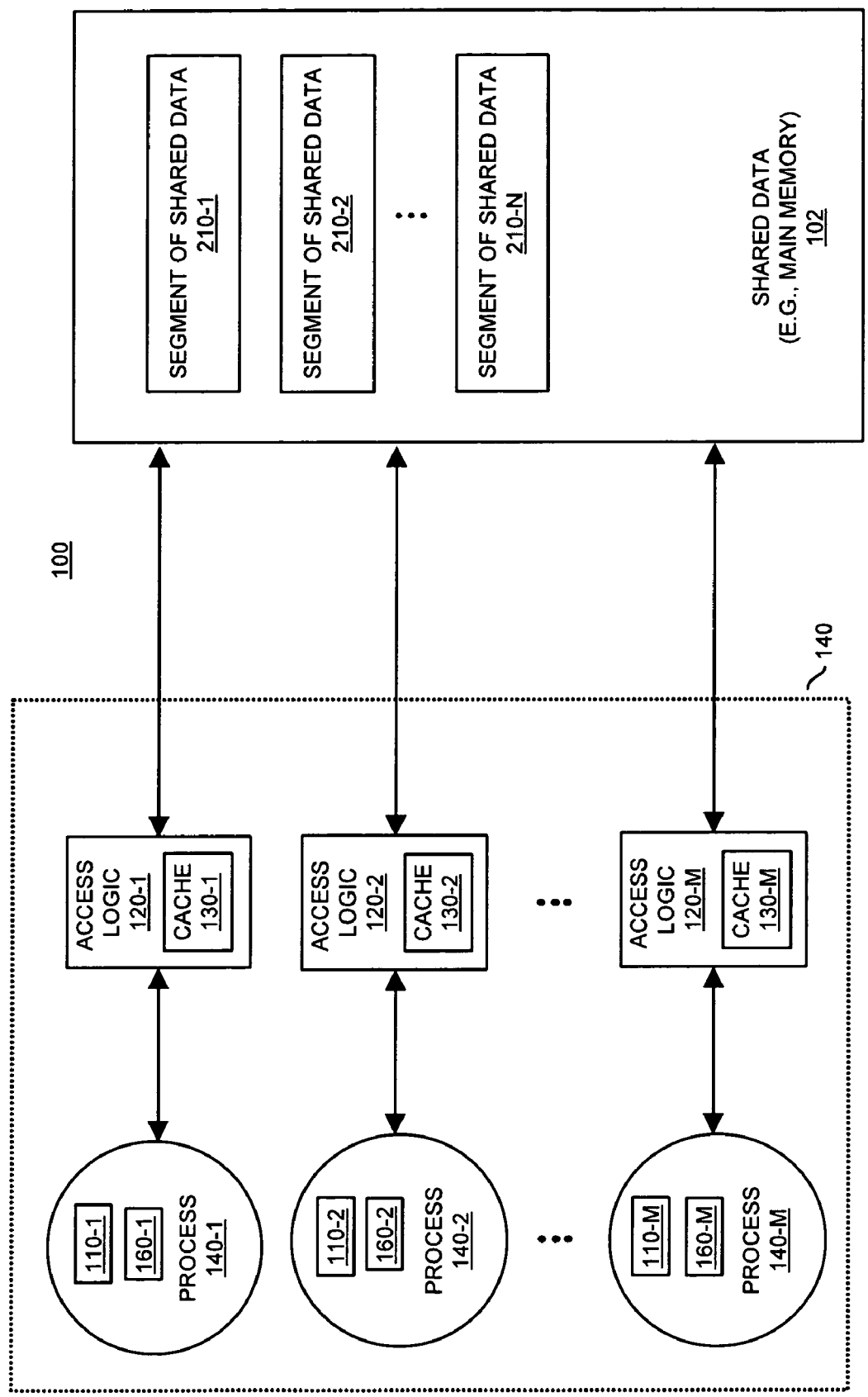
FIG. 1 is a diagram illustrating a computer environment enabling multiple processes to access shared data according to embodiments herein.

FIG. 1 is a block diagram of a computer environment 100 according to an embodiment herein. As shown, computer environment 100 includes multiple processes 140 (collectively, process 140-1, process 140-2, ... process 140-M) that operate in parallel and access shared data 102 to produce respective transaction outcomes. In one embodiment, each of processes 140 is a processing thread executed by a respective one of multiple processors. Segments of shared data 210-1, 210-2, ..., 210-N (e.g., regions of main memory accessible by each of processes 140) can include corresponding metadata such as metadata enabling each of processes 140 to identify which portions of shared data 102 have been "locked" by other processes and therefore should not be accessed at a particular time.

In one embodiment, shared data 102 includes lock information. The lock information (e.g., metadata) associated with each segment 210 (e.g., a single variable, a set of variables, an object, a stripe, a portion of memory, etc.) is a globally accessible bit or number of bits indicating whether one of processes 140 currently has "locked" a corresponding segment for purposes of modifying its contents. For example, a respective process such as process 140-1 can set lock information to a logic one or ON state indicating that segment 210-2 has been locked for use by a respective processing thread such as processing thread 140-1. In this case, by convention, the other processes know that contents of segment 210-2 should not and/or cannot be accessed, used, modified, etc. during the lock phase initiated by process 140-1. Upon completing a respective modification to contents of segment 210-2, process 140-1 resets the lock information to an OFF state. All processes 140 can then compete again to obtain a lock with respect to segment 210-2.

Process 140-1 includes access logic 120-1, corresponding cache 130-1, and write-set 160-1 to carry out a respective one or more transactions associated with process 140-1. Process 140-2 includes access logic 120-2, corresponding cache 130-2, and write-set 160-2 to carry out a respective transaction associated with process 140-2. Process 140-M includes access logic 120-M, corresponding cache 130-M, and write-set 160-M to carry out one or more transactions associated with process 140-M.

Each process 140 has associated access logic 120 (e.g., access logic 120-1, access logic 120-2, . . . access logic 120-M) for receiving access requests from a respective process 140 and obtaining corresponding data from either a respective cache 130 (e.g., cache 130-1, cache 130-2, . . . cache 130-M) or main memory (i.e., shared data 102). The respective access logic 120 decides whether to access requested data from main memory or the respective cache transparent to the processing thread. Typically, as in conventional use, an access of data from one of caches 130-2 is relatively fast compared to an access of data from shared data 102.

In general, data values loaded or read from shared data 102 during a respective transaction are stored in a respective cache 130. The data stored in the cache since the start of the transaction is known as a so-called read-set because it represents the data values accessed from shared data 102 that are used to carry out a respective transaction.

In addition to maintaining a respective read-set in a respective cache 130, each of processes 140 includes a region of storage to maintain a respective write-set 160 (e.g., a private local buffer or storage region not accessible by other processes) for at least temporarily storing computational results associated with a respective transaction. More specifically, each of processes 140 can store data values locally in its respective write-set 160 that are not accessible by the other processes 140. For example, process 140-1 can globally access a data value and, based on the accessed data value, produce a result that is locally stored in write-set 160-1 rather than writing the value immediately to shared data 102. During execution of a respective transaction, the process 140-1 is able to locally modify the data value in its write-set 160.

In a specific embodiment, each write-set 160-1 can store identifier information (e.g., address information, variable identifier information, etc.) as well as a corresponding data value for each respective globally shared variable that is locally modified during execution of the process or transaction.

In addition to a respective write-set 160, each process also includes a respective dedicated storage location 109 (e.g., storage location 109-1, storage location 109-2, . . . , storage location 109-M) for purposes of keeping track of information associated with a corresponding cache 130. As will be discussed further in this specification, if a data value associated with a respective cache does not change over the course of a respective execution of a transaction, then the respective process 140 can appropriately attempt to commit its results to shared data 102. This is more particularly discussed with respect to FIG. 2.

Eventually, the information in a respective write-set 160 is committed (or is attempted to be committed) to shared data 102. In one embodiment, a respective process 140 obtains locks on all (e.g., via a global lock) or respective portions (e.g., via multiple individual segment locks) of shared data to be modified prior to actual commitment of the results in a respective write-set to shared data 102 (e.g., memory). The commit phase used in this disclosure is similar to that discussed in related U.S. patent application Ser. No. 11/475,716, filed on Jun. 27, 2006, entitled "METHODS AND APPARATUS TO IMPLEMENT PARALLEL TRANSACTIONS", which itself claims the benefit of and priority to U.S. Provisional Patent Application Ser. No. 60/775,580, filed on Feb. 22, 2006, entitled "Transactional Locking", the entire teachings of which are incorporated herein by this reference. However, maintenance of a read-set happens to be done via a hardware transactional memory implementation in the present disclosure rather than in software as discussed in that application.

Transactions executed by respective processes 140 can be defined by one or more instructions of software code. Accordingly, each of processes 140 can execute a respective set of instructions to carry out a respective transaction. In one embodiment, the transactions executed by the processes 140 come from the same overall program or application running on one or more computers. Alternatively, the processes 140 execute transactions associated with different programs.

In the context of a general embodiment herein such as computer environment 100 in which multiple processes 140 (e.g., processing threads) execute transactions in parallel, each of processes 140 accesses shared data 125 to generate computational results (e.g., transaction results) that are eventually committed for storage in a respective repository storing shared data 125. Shared data 125 is considered to be globally accessible because each of the multiple processes 140 can access the shared data 125.

As will be discussed later in this specification, the results of executing the respective transaction can be globally committed back to a respective repository by storing shared data 125 depending on whether globally accessed data values happened to change during the course of the transaction executed by process 140-1. In general, a respective read-set 150-1 associated with each process stores information for determining which shared data 125 has been accessed during a respective transaction and whether any respective data values associated with globally accessed shared data 125 happens to change during execution of a respective transaction.

In one embodiment, each of one or more processes 140 complies with a respective rule or set of rules indicating transaction size limitations associated with the parallel transactions to enhance efficiency of multiple processes executing different transactions using a same set of shared variables including the given shared variable to produce respective transaction outcomes. For example, each transaction can be limited to a certain number of lines of code, a number of data value modifications, time limit, etc. so that potentially competing transactions do not end up in a deadlock.

As will be further discussed, embodiments herein include: i) maintaining a locally managed and accessible write set of data values associated with each of multiple shared variables that are locally modified during execution of the transaction, the local write set representing data values not yet a) globally committed and b) accessible by the other processes; ii) utilizing a respective hardware-based cache and corresponding status information to verify that respective data values associated with the multiple shared variables accessed during the transaction have not been globally modified by the other processes during execution of the transaction; iii) during a commit phase, initiating locks on each of the multiple shared variables specified in the write set which were locally modified during execution of the transaction to prevent the other processes from changing data values associated with the multiple shared variables to be modified and vi) after modifying data values associated with the multiple shared variables, releasing the locks on each of the multiple shared variables.

Figure 2:
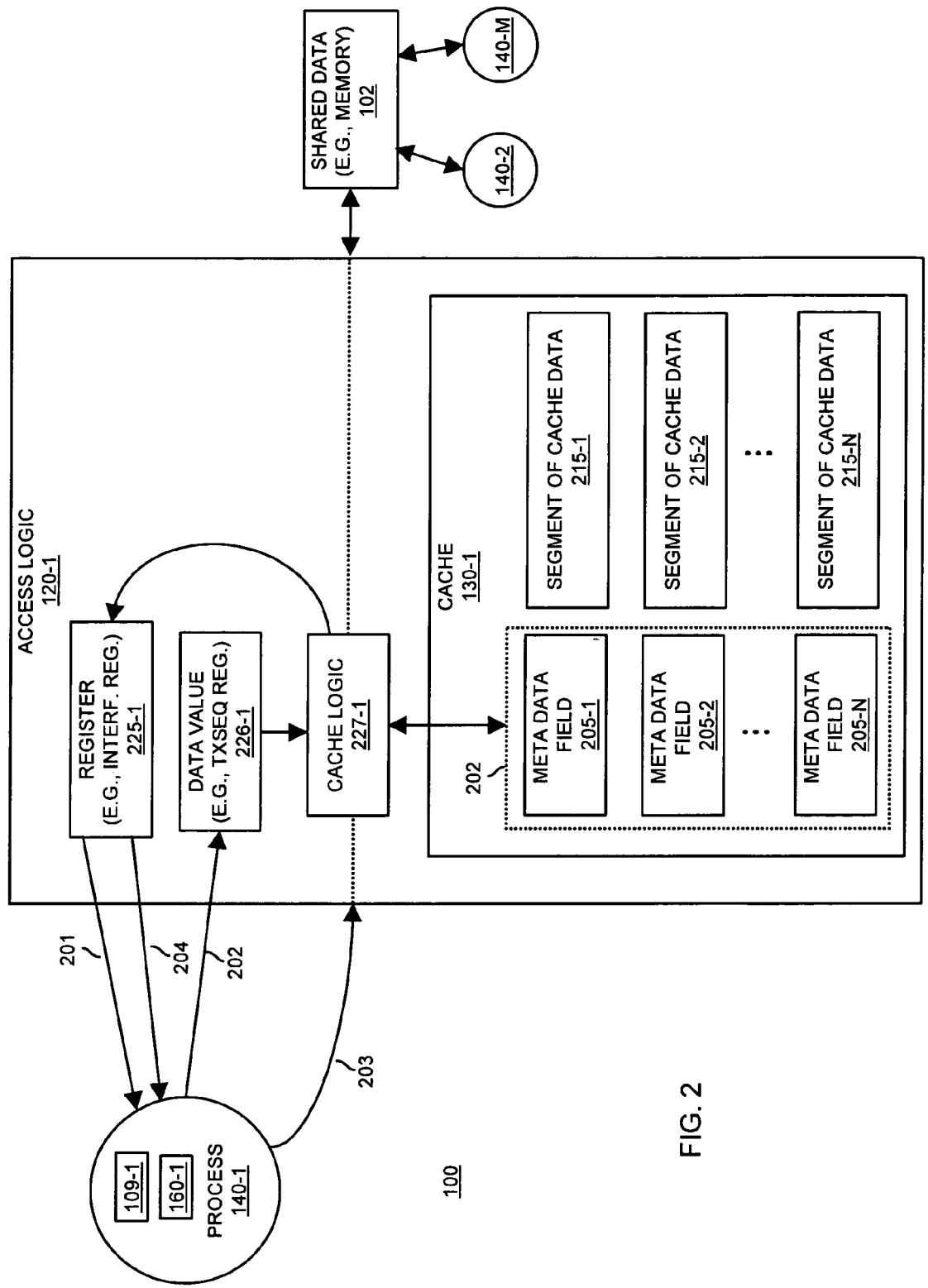
FIG. 2 is a diagram illustrating use of access logic associated with a respective processing thread to maintain a respective read-set according to embodiments herein.

FIG. 2 is a diagram illustrating how a respective process utilizes a hardware-based transactional memory implementation to verify that there were no changes to a respective read-set (e.g., variables of shared data retrieved from main memory) during execution of a respective transaction and a software based transactional memory implementation that maintains local modifications to data shared data 125 according to embodiments herein. Note that FIG. 2 illustrates how process 140-1 carries out execution of a respective transaction with respect to other processing threads. The other processes 140 operate in a similar manner.

As shown, FIG. 2 includes more details associated with access logic 120-1. For example, access logic 120-1 includes INTERFERENCE status register 225-1, register 226-1, and cache logic 227-1. Cache 130-1 includes metadata 202 and corresponding cache lines of cache data 215.

In one embodiment, cache 130-1 is divided to include cache line of cache data 215-1, cache line of cache data 215-2, . . . , and cache line of cache data 215-N. Each cache line of cache data 215 has a corresponding metadata field 205 for marking respective cache lines of cache data 205.

As shown, cache line of cache data 215-1 (e.g., a single variable, a set of variables, an object, a stripe, a portion of memory, etc.) has an associated metadata field 205-1; cache line of cache data 215-2 has an associated metadata field 205-2, and so on. The metadata fields 205 are used by a respective process to uniquely mark which cache lines in the cache 130 include corresponding data values that are used during execution of a respective execution of a process 140. In other words, as will be discussed, cache logic 227-1 of access logic 120-1 uniquely marks any data in cache 130-1 that is accessed by process 140-1 during execution of a respective transaction. If a same cache line of the cache being presently modified has already been marked with the unique value during the respective processing thread (e.g., the value in the TXSEQUENCE data field already matches the value of the TXSEQUENCE register on a cache line update), then the cache logic modifies (e.g., increments) a so-called interference register accessible by the respective processing thread. In other words, when a cache line of cache 130-1 is displaced, the processor will check the line's dc_txsequence field against the TXSEQUENCE register. If equal, the processor increments the INTERFERENCE register. This is a so-called case of remote eviction. In a similar vein, if a line associated with the read set is displaced through a capacity or conflict miss due to processor-local operations, the CPU will again check the dc-txsequence field against the value in TXSEQUENCE register 226-1 and conditionally increment the data value in the INTERFERENCE register. This is a so-called case of self-eviction. As will be discussed, in either case of local or remote eviction of a cache line, the transaction must be aborted due to the possibility of interference (e.g., data corruption) by another process.

In order to utilize cache 130-1 for maintaining a respective read-set, at the outset (e.g., before any reads to shared data 102 or computations resulting in writes to write-set 160-1) of a respective transaction, process 140-1 reads a respective data value in INTERFERENCE status register 225-1 (e.g., the interference register) via communication 201. The process 140-1 stores the value in location 109-1 for later use.

Thereafter, via communication 202, the process 140-1 modifies (e.g., increments) the data value in register 226-1 to a unique data value that has not been used for at least several previous transactions. The unique data value will be used to mark portions of cache 130-1 including read data values that are used by process 140-1 to produce a respective transaction outcome.

Note that register 226-1 is a multi-bit value. Accordingly, contents of the register 226-1 can eventually roll over to the same value over time.

Via communications 203, the process 140-1 then executes read and write operations of a respective transaction. The reads and writes issued as a result of executing a respective transaction associated with process 140-1 specify reads and writes to shared data 102. As discussed above, writes associated with a respective transaction are stored locally in write-set 160-1. Reads (or loads) issued by process 140-1 involve accessing data from the respective cache 130-1 if it is available or, alternatively, initiating access logic 120-1 to retrieve contents of shared data 102 (e.g., a variable, data value, etc.) if respective data is not available from cache 130-1. In this latter case, when cache logic 227-1 retrieves data from shared data 102 on behalf of process 140-1, it also stores a copy of the retrieved data in a cache line of cache data 215-1 of cache 130-1 and marks a corresponding metadata field 205 with a data value of register 226-1 (e.g., the unique stamp for the current transaction).

As an example, suppose that cache logic retrieves a data value from shared data 102 on behalf of process 140-1. In this case, the cache logic 227-1 forwards the data value to process 140-1 as well as stores the retrieved data value in a respective segment such as cache line of cache data 215-2. In addition to storing this value in cache line of cache data 215-2 in the cache 130-1, the cache logic 227-1 marks corresponding metadata field 205-2 with the unique data value in register 226-1. By repeating this technique for each access to shared data, the cache logic 227-1 effectively marks which contents of cache 130-1 are used in a particular transaction executed by process 140-1. The marked contents represent a respective read-set.

Lets assume a thread running on a processor accesses a location, and the processor, if necessary, loads the line containing the variable from shared data 102. The processor (e.g., cache logic) will then mark or annotate the dc_txsequence metadata field in that line with the current value found in the processor's TXSEQUENCE register (e.g., register 226-1). Subsequently, when the cache logic evicts a line (either because of self-eviction or because of remote stores) from the cache, if that line's dc_txsequence metadata field for the respective cache line matches the processor's current TXSEQUENCE register, then the cache logic will increment the INTERFERENCE register 225-1.

In one embodiment, the cache logic 227-1 verifies whether a displaced (or to be displaced) cache line has a corresponding metadata field 205 already marked with a respective unique data value for a current transaction. For example, the process 140-1 may have caused so many reads to shared data 102 that portions of cache 130-1 begin to get overwritten (e.g., due to self-eviction). If a corresponding cache line of cache data has already been stamped with the data value in register 226-1, then the cache logic 227-1 initiates a modification of (e.g., increments) contents of INTERFERENCE status register 225-1. This modification effectively produces status information indicating that at least a portion of a respective read-set (e.g., as uniquely marked in each metadata field by cache logic 227-1) in cache 130-1 has been modified or corrupted during a course of a respective transaction.

Changing the data value of INTERFERENCE status register 225-1 enables the process 140-1 to learn (e.g., via communication 204) whether a respective read-set has been corrupted. For example, at the end of a respective transaction, if the contents of INTERFERENCE status register 225-1 are the same as the contents of INTERFERENCE status register 225-1 read at the beginning of the transaction (e.g., as stored in location 109-1), then the read-set has not been "interfered with" by any other process executing in parallel (or potentially itself in a case of self-eviction) and the results of write-set 160-1 can be committed to shared data 102.

There are at least two cases that can cause the cache logic 227-1 to initiate modification of the contents in INTERFERENCE status register 225-1. First, a given process can initiate so many reads or loads from shared data 102 that cache logic 227-1 overwrites at least one portion of cache 130-1 during execution of the transaction. In this case of self-eviction, the cache logic 227-1 will end up overwriting a cache line of cache data 205 and overwriting a respective metadata field with the same unique data value in register 226-1.

Second, another one of processes 140 (e.g., process 140-2, . . . , process 140-M) can modify a respective variable in shared data 102 that was previously read and stored in cache 130-1. In such an instance, a cache coherency protocol operating in computer environment 100 initiates modification of a respective location of cache 130-1 so that the values in cache 130-1 remain synchronized with those in shared data 102. As previously discussed, when a displaced cache line of cache data 205 already happens to be stamped with the unique value in register 226-1, then the cache logic 227-1 modifies the data value in INTERFERENCE status register 225-1 flagging the condition.

Additional status information can be maintained by access logic 120-1 to identify a respective reason why the cache logic 227-1 modifies the INTERFERENCE status register 225-1. If a metadata field 205 is overwritten as a result of a respective overflow or "over-usage" condition as indicated by the additional stat-us information, then the process 140-1 can abandon trying to use the hybrid transactional memory implementation and retry (e.g., re-execute the same aborted transaction) the transaction using a pure software transactional memory implementation in which a respective process 140-1 maintains both a read-set and write-set as discussed in related U.S. Patent Application identified by Attorney's docket no. SUN06-04(060720), filed on Jun. 27, 2006, entitled "METHODS AND APPARATUS TO IMPLEMENT PARALLEL TRANSACTIONS," which has been incorporated herein by reference. If the INTERFERENCE register 225-1 happens to change during a transaction, then the respective process 140-1 can retry a transaction. There is a good chance that a respective transaction can follow through to completion even though it happened to fail on a first attempt.

In one embodiment, only INTERFERENCE status register 225-1 and register 226-1 are visible to the process 140-1. The metadata fields 205 are transparent to process 140-1. Additionally, accesses to shared data and/or cache 130-1 are handled by cache logic 227-1. Thus, specific operations by cache logic 227-1 are transparent as well.

Note that certain environments include variables in cache 130-1 that are overwritten or displaced, but which should not cause the process 140-1 to abort committing the write-set to shared data 102. For such values inc cache, the cache logic 227-1 can utilize a second unique data value such as zero to indicate values in the cache 130-1 that are not be considered part of a respective read-set and overwriting of which (during a respective transaction) will not cause the cache logic 226-1 to increment a data value in INTERFERENCE status register 225-1. Thus, the access logic 120-1 includes the equivalent of a read-set for a respective transaction. Each cache line (via a TXSEQUENCE datafield) associated with the read set is marked with the unique TXSEQUENCE register value (e.g., register 226-1) for the respective transaction. Based on use of the second unique value, the cache logic 227-1 associated with a respective transaction writes a logic zero (or some other dummy value) to any cache lines that store values that do not matter whether they change or not during a transaction. The cache lines marked with the zero values are not considered part of the actual read set in the cache, or at least not a portion that we care about.

Thus, the hardware transactional memory implementation according to embodiments herein can include reserving and utilizing a unique data value to mark cache entries used in a respective transaction for purposes of identifying self-eviction and remote eviction as discussed above.

Figure 3:
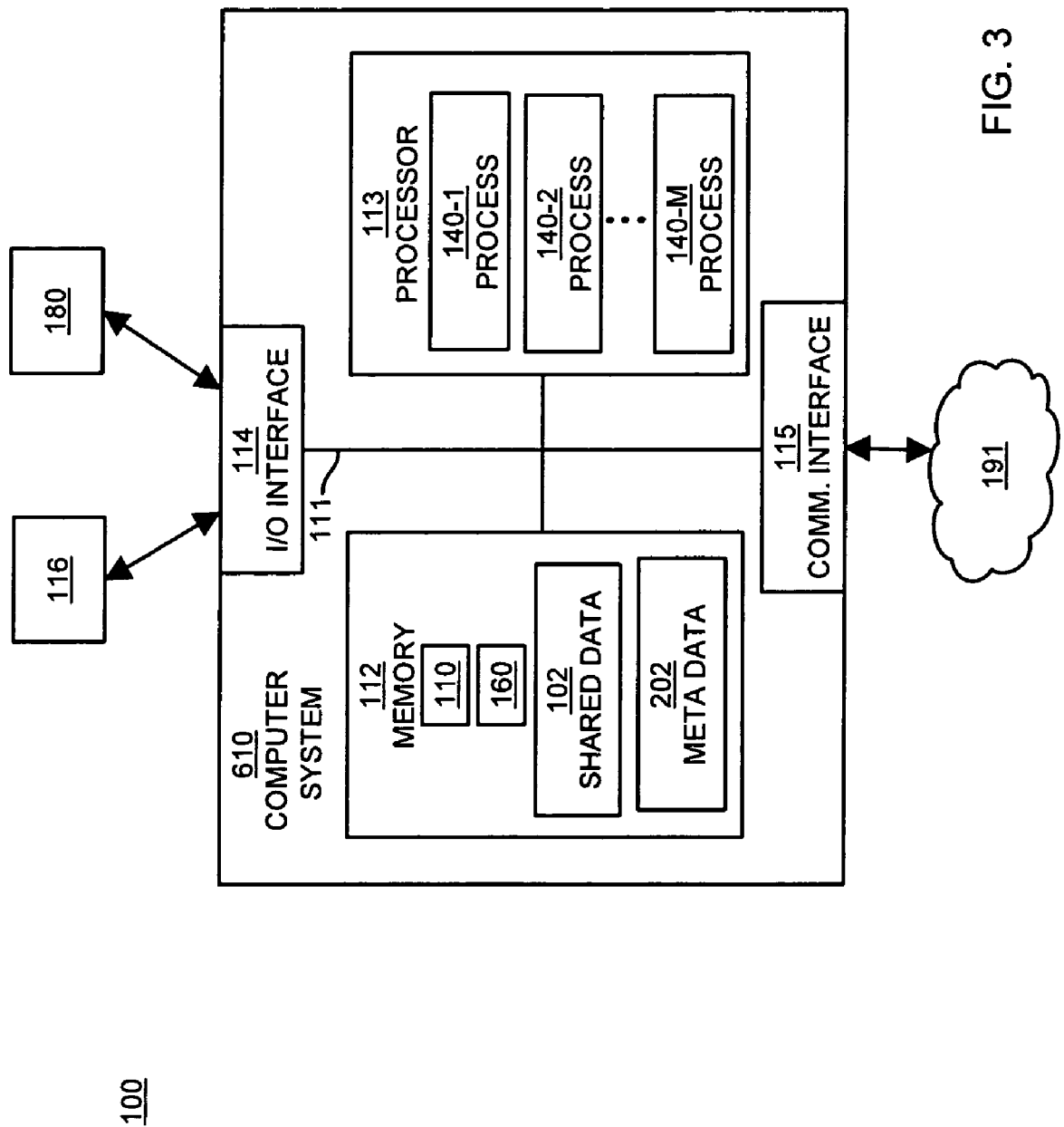
FIG. 3 is a diagram of a sample architecture supporting shared use of data according to embodiments herein.

FIG. 3 is a block diagram illustrating an example computer system 610 (e.g., an architecture associated with computer environment 100) for executing parallel processes 140 and other related hardware and software processes according to embodiments herein. Computer system 610 can include one or more computerized devices such as a personal computer, workstation, portable computing device, console, network terminal, processing device, etc. Each process 140 can run on a corresponding one of multiple processors in computer system 610.

As shown, computer system 610 of the present example can include an interconnect 111 that couples a memory system 112 storing shared data 102 and metadata 202, one or more processors 113 executing respective processes 140, an I/O interface 114, and a communications interface 115. Peripheral devices 116 (e.g., one or more optional user controlled devices such as a keyboard, mouse, display screens, etc.) can couple to processor 113 through I/O interface 114. I/O interface 114 also enables computer system 610 to access repository 180 (that also potentially stores shared data 125 and/or metadata 135). Communications interface 115 enables computer system 610 to communicate over network 191 to transmit and receive information from different remote resources.

Note that processes 140 and related processes can be embodied as software code such as data and/or logic instructions (e.g., code stored in the memory or on another computer readable medium such as a disk) that support functionality according to different embodiments described herein. Alternatively, the functionality associated with processes 140 can be implemented via hardware or a combination of hardware and software code.

It should be noted that, in addition to the processes 140 themselves, embodiments herein include a respective application and/or set of instructions to carry out processes 140. Such a set of instructions associated with processes 140 can be stored on a computer readable medium such as a floppy disk, hard disk, optical medium, etc. The set of instruction can also be stored in a memory type system such as in firmware, RAM (Random Access Memory), read only memory (ROM), etc. or, as in this example, as executable code. Execution of the respective instructions enables the computer system 610 to carry out operations as discussed herein.

Attributes associated with processes 140 will now be discussed with respect to flowcharts in FIG. 4-7. For purposes of this discussion, each of the multiple processes 140 in computer environment 100 can execute or carry out the steps described in the respective flowcharts. Note that the steps in the below flowcharts need not always be executed in the order shown.

Figure 4:
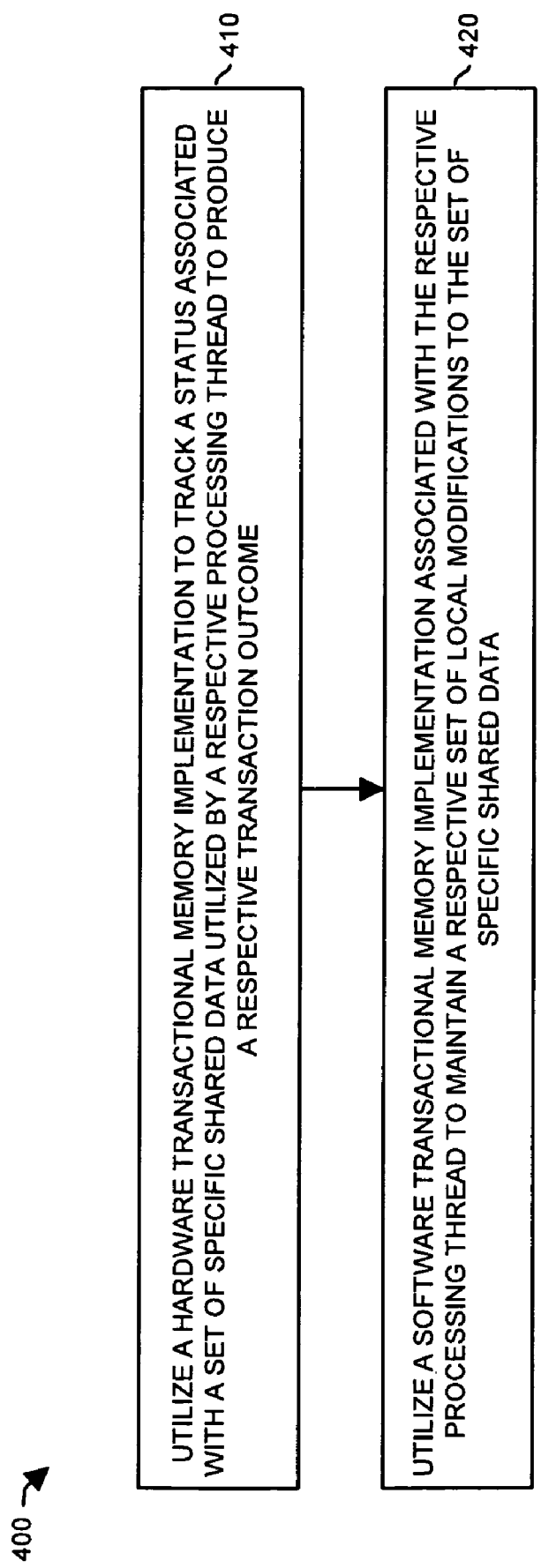
FIG. 4 is a diagram of a flowchart according to an embodiment herein.

Now, more particularly, FIG. 4 is a flowchart 400 illustrating a technique supporting execution of parallel transactions in computer environment 100 according to an embodiment herein. Note that techniques discussed in flowchart 400 overlap and summarize some of the techniques discussed above in which each of multiple processing threads execute in parallel and have access to a common set of shared data to produce corresponding transaction outcomes.

In step 410, a respective one of multiple processes 140 utilizes (e.g., relies on) a hardware transactional memory implementation to track a status associated with a set of specific shared data utilized by a respective processing thread to produce a respective transaction outcome.

In step 420, the respective process utilizes a software transactional memory implementation associated with the respective processing thread to maintain a respective set of local modifications to the set of specific shared data. In other words, the respective processing thread itself maintains a respective write-set 160 for temporarily storing data values.

Figure 5:
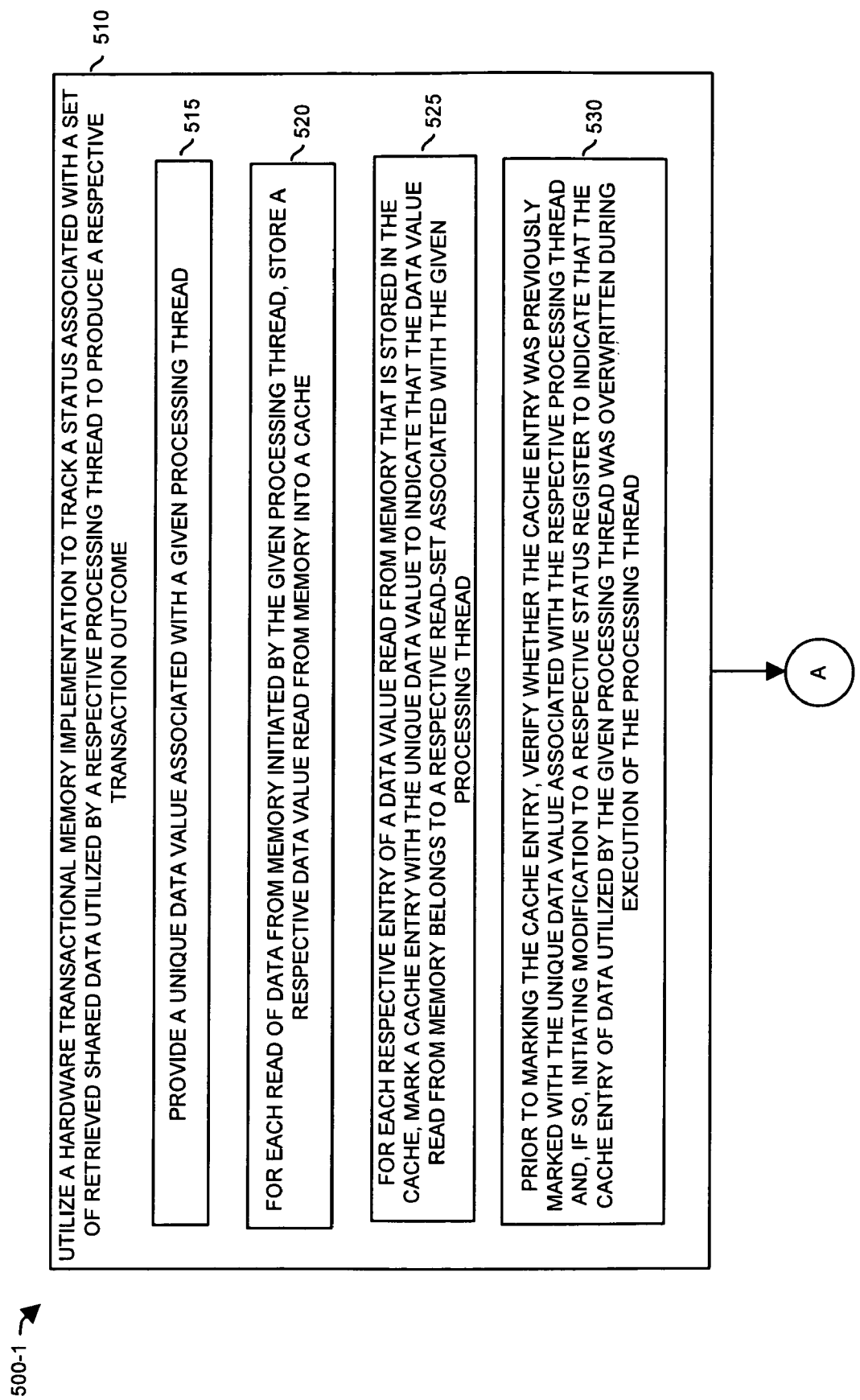
FIGS. 5 and 6 combine to form a respective flowchart according to an embodiment herein.
Figure 6:
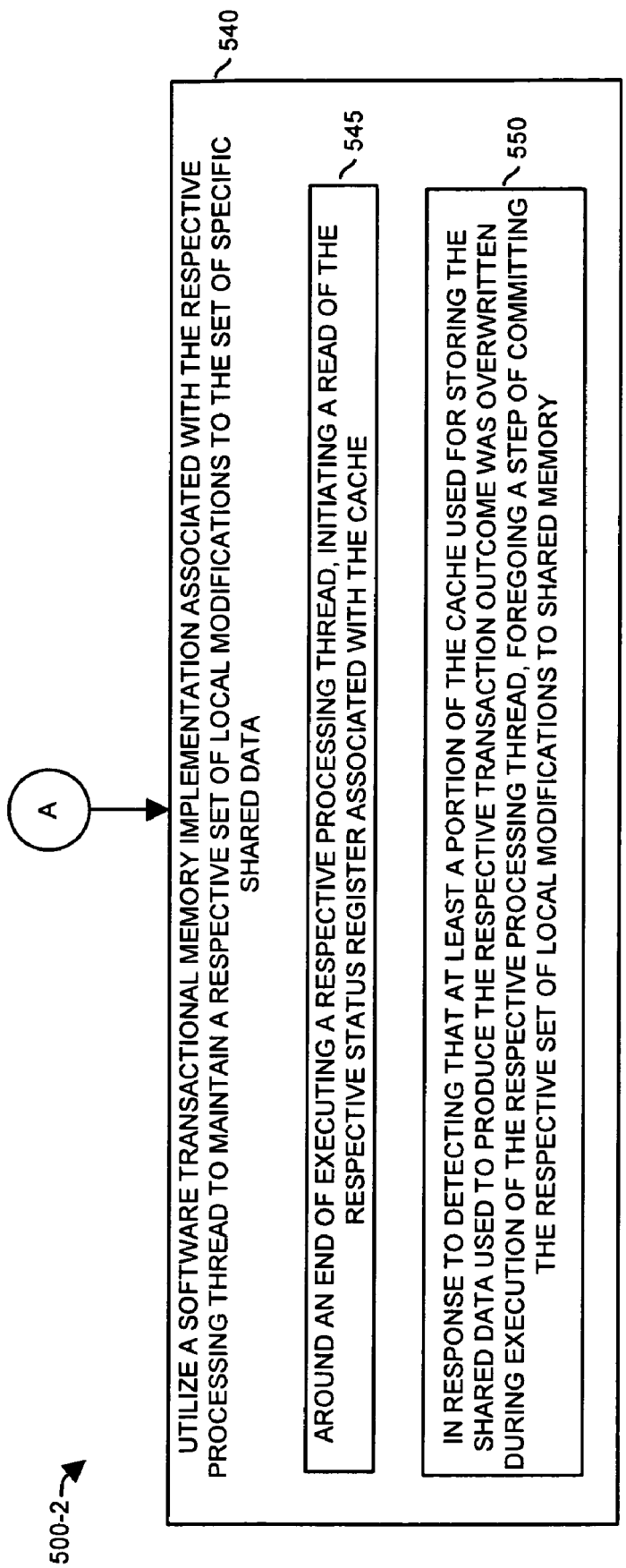

FIGS. 5 and 6 combine to form a flowchart 500 (e.g., flowchart 500-1 and flowchart 500-2) illustrating processing steps associated with processes 140 according to an embodiment herein. Note that techniques discussed in flowchart 500 also overlap with the techniques discussed above in the previous figures.

In step 500 in flowchart 500-1, each of multiple processes 140 utilize a hardware transactional memory implementation (e.g., a cache, metadata fields, and corresponding status registers) to track a status associated with a set of retrieved shared data utilized by a respective processing thread to produce a respective transaction outcome.

For example, in sub-step 515 associated with step 510, a given process 140 provides a unique data value to register 226-1.

In step 520 in flowchart 500-1, for each read of data from memory initiated by the given processing thread, the given process 140 stores a respective data value read from shared data 102 (e.g., memory) into a respective cache.

In sub-step 525 of step 510, for each respective entry of a data value read from memory that is stored in the cache, the given processing thread marks a cache entry (e.g., a respective metadata field 205) with the unique data value in register 226-1 to indicate that the data value read from memory belongs to a respective read-set associated with the given processing thread.

In sub-step 530 of step 510, prior to displacing a respective cache line of cache 130, the given processing thread verifies whether a respective metadata field 205 of the cache entry was previously marked with the unique data value associated with the respective processing thread and, if so, initiates modification to a respective status register to indicate interference by another simultaneously executing processing thread.

In step 540 of flowchart 500-2, the given processing thread utilizes a software transactional memory implementation associated with the respective processing thread to maintain a respective set of local modifications to the set of specific shared data.

In sub-step 545 of step 540, around an end of executing a respective processing thread, the given processing thread initiates a read of the respective status register associated with the cache.

In sub-step 550, in response to detecting that at least a portion of the cache used for storing the shared data used to produce the respective transaction outcome was overwritten during execution of the respective processing thread, the given processing thread foregoes a step of committing the respective set of local modifications to shared memory. In one embodiment, the given processing thread aborts the final process of committing the respective set of local modifications to shared data (e.g., main memory).

FIG. 7 is a flowchart 700 illustrating another technique associated with use of a INTERFERENCE status register 225-1 (e.g., the INTERFERENCE register) according to embodiments herein. Note that techniques discussed in flowchart 700 overlap and summarize some of the techniques discussed above.

In step 710, at an outset of executing a respective processing thread, a given processing thread reads and stores a data value from INTERFERENCE status register 225-1 associated with the cache.

In step 715, the given processing thread initiates access to shared data 102 (e.g., memory).

In step 720, the given processing thread stores shared data accessed from the memory to a respective cache.

In step 725, the given processing thread maintains a respective local write-set 160 separate from the cache to locally store modifications rather than store the modifications in memory.

In step 730, the given processing thread maintains status information associated with a respective cache. The status information indicates a respective reason why at least one cache entry of the cache has been written to two or more times during a course of executing a respective processing thread. In one embodiment, the status information provides an indication (e.g., based on modifying the status information) that another processing thread modified a value in memory having a corresponding copy stored in the cache. The status information also can provide an indication (e.g., by modifying the status information) that the processing thread required so many accesses to memory that corresponding copies of the accesses stored in the cache caused cache entries of the cache to be overwritten.

In step 735, at an end of executing the processing thread and prior to committing the set of local modifications to memory, the given processing thread verifies whether the data value previously read from the storage location at the outset of executing the processing thread matches a current data value of the storage location.

As discussed above, techniques herein are well suited for use in applications such as those that support parallel processing of threads in the same or different processors. However, it should be noted that configurations herein are not limited to such use and thus configurations herein and deviations thereof are well suited for use in other environments as well.

Details of a Hybrid Transactional Locking Technique

In view of the embodiments discussed above, a set of concurrently executing threads can use either pessimistic or optimistic concurrency control to safely moderate access to shared data. Pessimistic concurrency control prevents undesirable or inopportune interleavings by means of mutual exclusion (locks) while optimistic concurrency control detects and recovers from inopportune interleavings.

Optimistic concurrency control mechanisms can be expressed by way of transactions. A transaction typically has an operational phase, where the transaction reads shared variables (the read-set) and produces a tentative or contingent set of updates (the write-set) transiently stored in a private buffer, followed by a commit set, where the read-set is validated and updates contained within the write-set are made public or visible to other threads. If read-set validation fails the transaction aborts, discarding the accumulated write-set. Presumably the read-set values are used as inputs to produce the write-set. If the read-set changed during the midst of a transaction because of concurrent updates performed by other threads (i.e., if the read set became inconsistent) the resultant write-set is invalid. In this case the application code will typically retry the transaction. Note that commit is simply a specialized form of multi-word CAS (Compare and Swap) or (MWCAS). Transactional support can be implemented in hardware, software, or a hybrid of hardware and software.

Consider a protocol that allows concurrent threads to update a variable without risk of interference or data races. A pessimistic form would acquire a lock that was, by convention, associated with the variable, load the variable into a register, increment the register, store the register contents back into a variable, and finally release the lock. An optimistic form could be implemented with the commonly available compare-and-swap (CAS) instruction by loading the variable into a register, incrementing the register (forming a tentative new value) and then using CAS to try to install the value over the original value. The CAS will fail if some other thread asynchronously changed the variable's value between the load and the CAS. In that case the operation must be retired. CAS provides a single-word transaction. The CAS-based form has the advantage of being lock-free; in a lock-based form, if the owner is preempted or stalls, other threads trying to increment the variable may be impeded. That risk does not appear in the CAS-based form.

Forthcoming hardware transactional memory (HTM) implementations, such as the ones found in Sun's processor architectures, implement the read-set and writer-set and constructs in hardware. The read-set consist of the set of locations read during a transaction, while the write-set holds the set of contingent deferred stores. The processor tracks the consistency of the read-set during the transaction, aborting the transaction if the read-set happens to be modified by another processor before the transaction can commit. A commit will abort unless the read-set remains consistent (unmodified by external agents). Capacity of a hardware-based read-set and write-set are highly constrained in Sun's processor architectures. Transactional implementations that exceed those constraints are infeasible and will always abort.

Transactional memory can be implemented in software. For instance Transactional Locking or TL as discussed in related U.S. patent application Ser. No. 11/475,716, filed on Jun. 27, 2006, entitled "METHODS AND APPARATUS TO IMPLEMENT PARALLEL TRANSACTIONS", employs versioned write-locks. Each shared variable is associated with one write-lock. In one TL embodiment, the versioned write-lock consists of a word where the low-order bit serves as a write-lock, and the remaining bits form a version number. A transactional write does not update a shared target variable, but instead the address and speculative value are held in the write-set. A TL transactional read fetches both the "lockword" and the variable. The write-lock bit of the lockword must be inspected to ensure that the variable is currently unlocked. Assuming that this is the case, the TL load operator then saves the address of the lockword and observed lockword version into the software-maintained read-set. At commit-time TL acquires the locks associated with the write-set and then checks the read-set to ensure that the previously observed lockword versions kept in the read-set still match the current lockword versions. If not, the transaction aborts, otherwise the transaction is deemed successful and the commit operator writes-back the contents of the write-set into their ultimate locations (the shared variables). Finally, the commit operator releases the write-set locks and increments the lockword version numbers. Read-sets and write-sets are thread-local software constructs. Whereas one of Sun's processor architectures includes transactional memory that tracks the consistency of the read-set by leveraging the existing cache coherency mechanism, software transactional locking tracks consistency with explicit version numbers maintained in the versioned write-locks.

According to one embodiment herein, we propose decoupling the transactional read-set and the write-set as previously discussed. A novel hardware assist mechanism, described above and further below, uses a processor's existing snoop-based cache-coherency mechanism to track the read-set an ensure consistency. The write-set can be managed entirely in software using locking, as described in This application is related application Ser. No. 11/475,716, filed on Jun. 27, 2006, entitled "METHODS AND APPARATUS TO IMPLEMENT PARALLEL TRANSACTIONS". Given that read-sets tend to be much larger than write-sets and that read-set maintenance costs tend to dominate the cost of transactions, use of hardware for read-sets but locks for write-sets is a viable approach.

According to a specific embodiment, we add two new registers to each respective processor in a multi processor environment: i) a TXSEQUENCE register that is readable and writable by a respective processor in user-space. In one embodiment, the TXSEQUENCE register is 8 bits wide, allowing for 256 possible unique values although this can vary depending on the application, and ii) an INTERFERENCE register that is 64-bit register readable but not writeable.

For a respective cache associated with a given processor, we add a new dc_txsequence field to each cache line. According to conventional applications, cache lines already contain tag, invalid, MESI/MOESI coherency state bits, and data. Thus, the dc_txsequence field added to each cache line supplements the current bits. Each time a word is loaded from the cache line, a respective processing thread will set the line's dc_txsequence field to value contained in the processor's TXSEQUENCE register. In other words, the given processing thread will mark the value stored in the cache for identification purposes.

The TXSEQUENCE register and the INTERFERENCE register are used as follows. At the start of a transaction, a respective thread (e.g., processing thread) increments the TXSEQUENCE number and then reads and saves the current data value of the INTERFERENCE register and stores it as part of the transaction metadata. The processing thread proceeds with a respective transaction, executing reads from both the read-set variables and the versioned locks "covering" those read-set variables. The hardware-based transactional memory implementation as discussed herein enables the respective processing thread to forgo saving the lock address and version in the read-set. (The read-set is neither constructed during the transaction nor consulted at commit-time). The modified processor stores the current TXSEQUENCE value into the cache line's dc-txsequence field on each read (load). If some other processor modifies main memory resulting in updating of a respective cache line associated with a transaction, the cache line will be invalidated and displaced (or evicted) from the cache.

When a line is displaced from the cache, the processor will check the line's dc_txsequence field against the TXSEQUENCE register. If equal, the processor increments the INTERFERENCE register. This is a so-called case of remote eviction. In a similar vein, if a line associated with the read set is displaced through a capacity or conflict miss due to processor-local operations, the CPU will again check the dc_tx-sequence field against TXSEQUENCE and conditionally increment the data value in the INTERFERENCE register. This is a so-called case of self-eviction.

Since the cache tracks coherency, if a line containing a read-set variable "leaves" the data cache, the processor loses the ability to track coherency and detect remote updates. In that case the processor must conservatively increment the INTERFERENCE register. In one embodiment, a coherency protocol used by a respective data cache detects remote interference with respect to the read-set (e.g., values read by a current processing thread). To use the data cache in this manner, the read-set (e.g., values read from main memory stored in the cache and used in the transaction) must remain continuously present in the data cache from the $1^{st}$ load until committal of the respective write-set to main memory.

At commit-time we use the TL protocol to acquire write-locks (if any) in the normal fashion. We then check the current INTERFERENCE value against the value previously saved at the start of the transaction. If they remain the same then the read-set is known to be consistent. Subsequently, if the transaction is successful, the write-set will be spilled into main memory, the write-set locks released, and the write-set version number will be incremented. If the value of the INTERFERENCE register differs then the read-set *may* be inconsistent and we abort. Because of aliasing on the TXSEQUENCE values or local capacity and conflict eviction our mechanism admits false-positive aborts. In the case of an abort we can simply retry the transaction but revert to the software-only TL scheme to provide read-set validation. Using our scheme allows us to eliminate read-set construction and provides for very low-latency read-set consistency validation in the majority of cases. In addition it's likely that we allow larger read-sets and transactions than other of Sun's processor architectures.

As described above, the hardware assisted read-set validation mechanism can utilize sets of dc_txsequence fields added to the cache. As caches are often built from SRAM (Static Random Access Memory), implementing this extra data field can be costly. Instead of adding dc-txsequence to each line of cache, another embodiment can instead implement as dedicated coherency tracking cache akin to the Store Miss Accelerator Cache [SMAC] described in MICRO5. No data would be stored in this specialized cache, which might have higher a degree of "associativity" but less capacity. The coherency cache would participate in the usual cache coherency protocols used by the primary data cache.

Consider use of the techniques described herein in one of Sun's processor architectures. On such systems, each strand would have private strand-specific TXSEQUENCE and INTERFERENCE registers. In this case, the processor uses a shared L2 (level-2) cache. Each logical CPU on a respective processor is called a strand. We'd concatenate the strandid with strand's private txsequence register and then store that resultant value in the L2 cache line in the txsequence field. Suppose that strand#1 has a txsequence value of 2009. Strand#1 executes a load that accesses cache line #5. In cache line #5 we'll write (1, 2009). If strand#3 writes to a word contained in cache line #5, the logic will detect the modification as follows. Line #5's strandid is 1. The logic then checks strandid#1's txsequence register, which for our example will still be 2009. The 2009 in strandid#1's txsequence register matches the txsequence value in the cache line (also 2009), so the logic will increment strandid #1's interference counter.

In one embodiment, it might be useful to augment the INTERFERENCE register with additional status bits that indicate why the last increment of the INTERFERENCE register was performed. The status bits can indicate whether there was a local capacity-conflict displacement or displacement caused by remote update of main memory. If INTERFERENCE was updated because of capacity or conflict displacement, then retrying the same operation using the hardware assisted mode where software does not track the read-set is likely to be futile. In such a case, the above mentioned hybrid method can be aborted in favor of reverting immediately to a traditional locking mode in which the TL transactional infrastructure logs and validates the read-set. If the operation failed because of remote interference, however, retrying again using the hardware assist is likely the best policy.

In yet another embodiment, a wider TXSEQUENCE and dc_txsequence fields will reduce the rate of false positive INTERFERENCE aborts. Since TXSEQUENCE can wrap-around, old, residual lines in the cache that are not part of the current read-set might have dc_txsequence values that inadvertently match the current TXSEQUENCE register. This condition does not adversely affect safety or correctness, but it might impact performance.

In further embodiments, a given processing thread increments TXSEQUENCE on all taken traps or exceptions. This permits TL to be used by the kernel—and user—mode or by difference threads on the same processor.

Finally, as discussed above, it can be useful to prevent certain data loads from being add to a respective read-set in the cache for a particular transaction. Examples include global flags that never change, local variables on a re processing thread's own stack, etc. These include variables that either don't change, are not shared, or where it does not matter if the variable's values changes while the transaction is in-progress.

A simple way to achieve exclusion of a respective data value from a read-set in the cache is to designate a distinguished load stamp that is used to mark a targeted cache line with a TXSEQUENCE field value of, for example, the value 0. This can be done via new type of load instruction, or on processors such as SPARC ™ that permit loads to be annotated with a special 'alternate address space ID', we could create a new address-space-id that was for non-transactional loads. By convention, software would never use txsequence value 0. (For instance, if we had an 8-bit wide txsequence registers, a respective processing thread designate use of values 1 . . . 255, and never designate 0 as a unique stamp for marking data in the cache. Thus. when incrementing register 226-1 as discussed above (e.g., the txsequence value) at the start of a respective transaction, the processing thread would skip incrementing a respective data value to 0.

Note that the above hardware-based transactional memory implementation is not required to be used in conjunction with the software transactional memory implementation as discussed above. It can be used with other suitable software or software-hardware transactional memory implementations.

Note that in one embodiment, instead of (or in addition to) checking the INTERFERENCE register at commit-time, we could instead arrange for the processor to generate a trap or interrupt when it increments the INTERFERENCE register. Also, in addition the TXSEQUENCE and INTERFERENCE registers, further embodiments herein include a VICTIMADDRESS register which would record the virtual address or physical address of the last eviction or invalidation that caused INTERFERENCE register to be incremented. The VICTIMADDRESS could be used by software performance monitoring software to detect "hot" or often-conflicting data variables. The programmer could use that information to redesign his code to reduce data conflicts and thus the abort rate.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present disclosure. As such, the foregoing description of embodiments of the present application is not intended to be limiting. Rather, any limitations to the invention are presented in the following claims. Note that the different embodiments disclosed herein can be combined or utilized individually with respect to each other.

We claim:

1. A method comprising:
   for each of multiple processing threads that execute in parallel and that have access to a common set of shared data to produce corresponding transaction outcomes:
   i) utilizing a hardware transactional memory implementation to track a status associated with a set of specific shared data utilized by a respective processing thread to produce a respective transaction outcome; and
   ii) utilizing a software transactional memory implementation associated with the respective processing thread to maintain a respective set of local modifications to the set of specific shared data.

2. A method as in claim 1, wherein utilizing the hardware transactional memory implementation to track the status includes providing an indication when any portion of a cache used for storing the set of specific shared data has been previously written to during execution of the respective processing thread.

3. A method as in claim 2 further comprising:
   foregoing a step of committing the respective set of local modifications to shared memory in response to detecting that at least a portion of the cache used for storing the specific shared data to produce the respective transaction outcome was displaced during execution of the respective processing thread.

4. A method as in claim 1, wherein utilizing the hardware transactional memory implementation includes:
   providing a unique data value associated with a given processing thread;
   for each read of data from memory initiated by the given processing thread, storing a respective data value read from memory into a cache; and
   for each respective entry of a data value read from memory that is stored in the cache, marking a cache entry with the unique data value to indicate that the data value read from memory belongs to a respective read-set associated with the given processing thread.

5. A method as in claim 4 further comprising:
   prior to marking the cache entry, verifying whether the cache entry was previously marked with the unique data value associated with the respective processing thread and, if so, initiating modification to a respective status register to indicate that the cache entry of data utilized by the given processing thread was overwritten during execution of the processing thread.

6. A method as in claim 5 further comprising:
   in response to detecting the modification of the respective status register, aborting a process of committing the respective set of local modifications to the memory.

7. A method as in claim 1, wherein utilizing the hardware transactional memory implementation includes reserving a unique data value to mark at least a portion of cache entries that are not part of a respective read set associated with the respective processing thread.

8. A method as in claim 1, wherein utilizing the hardware transactional memory implementation includes:
   maintaining a cache;
   utilizing the cache to store copies of the set of specific shared data retrieved from memory; and
   maintaining a storage location associated with the cache, the storage location being used to store a respective data value that is modified in response to detecting that contents of the cache have been displaced prior to committal of the set of local modifications to the memory.

9. A method as in claim 8, wherein execution of the respective processing thread includes:
   at an outset of executing the respective processing thread, reading a data value from the storage location for later use;
   initiating access to memory to produce the set of specific shared data;
   storing the specific shared data in the cache; and
   at an end of executing the processing thread and prior to committing the set of local modifications to memory, verifying whether the data value previously read from the storage location matches a current data value of the storage location.

10. A method as in claim 8 further comprising:
    maintaining status information associated with the storage location, the status information indicating a respective reason for displacement of at least one cache entry during a course of executing the respective processing thread.

11. A method as in claim 10, wherein maintaining status information includes at least one of:
    providing an indication that another processing thread modified a value in memory having a corresponding copy stored in the cache; and
    providing an indication that the processing thread required so many accesses to memory that corresponding copies of the accesses stored in the cache caused cache entries of the cache to be overwritten.

12. A method as in claim 1, wherein utilizing the hardware transactional memory implementation includes:
    enabling the processing thread to provide a unique data value to be used to mark multiple entries in a respective cache as belonging to the set of specific shared data associated with the respective processing thread.

13. A computer system including:
    multiple processing threads executing in parallel;
    memory to store shared data that is accessible to each of the multiple processing threads;
    for each of the multiple processing threads:
    i) a respective cache and corresponding hardware logic for storing and marking accessed shared data values from memory, the accessed shared data values used by a respective processing thread to produce a respective transaction outcome; and
    ii) a buffer to store a write-set maintained by the respective processing thread to temporarily store values in a local buffer prior to committing the values to the shared data.

14. A computer system as in claim 13, wherein the respective cache and corresponding hardware logic include associated status information to enable the respective processing thread to identify whether any of the accessed shared data values have been modified over a course of executing the respective processing thread.

15. A computer system as in claim 14, wherein the corresponding hardware logic includes a first register and a second register accessible by the respective processing thread, the first register storing a unique data value provided by the respective processing thread to mark the accessed shared data values stored in the cache, the second register storing a respective data value that is modified by the corresponding hardware logic to indicate when contents of the cache have been overwritten.

16. A computer system as in claim 15, wherein the respective processing thread accesses contents of the second register to identify at least one of: i) whether another processing thread modified a value of shared data during execution of the processing thread causing a corresponding copy of the value to be stored in the cache, and ii) whether the processing thread required so many accesses to shared data over a course of executing a respective transaction that at least a portion of corresponding copies of the accessed shared data in the cache have been overwritten.

17. A computer readable medium storing:
   instructions for a respective processing thread of multiple processing threads executing in parallel to rely on use of a hardware transactional memory implementation to track a status associated with a set of specific shared data utilized by a respective processing thread to produce a respective transaction outcome; and
   instructions to implement a transactional memory technique associated with the respective processing thread to maintain a respective set of local modifications to the set of specific shared data.

18. A computer readable medium as in claim 17 further storing:
   instructions for the respective processing thread to access a respective register associated with a cache used for storing the set of specific shared data, the respective register indicating whether any portions of the cache have been displaced during execution of the respective processing thread.

19. A computer readable medium as in claim 18 further storing:
   instructions to forego a step of committing the respective set of local modifications to shared memory in response to detecting that at least a portion of the cache used for storing the set of specific shared data to produce the respective transaction outcome was overwritten during execution of the respective processing thread.

20. A computer readable medium as in claim 17 further storing:
   instructions to read an initial data value from a storage location for later use;
   instructions to initiate access to the shared data in memory to produce the set of specific shared data; and
   instructions to, at an end of executing the processing thread and prior to committing the set of local modifications to memory, verify whether the data value previously read from the storage location matches a current data value of the storage location, the current data value being different from the initial data value if any data values associated with reads performed by the respective processing thread changed during execution of the respective processing thread.

* * * * *